United States Patent [19]
Clarke et al.

[11] 3,819,070
[45] June 25, 1974

[54] BULK MATERIAL HANDLING SYSTEM
[75] Inventors: Edwin E. Clarke, Allentown; Albert J. Florig, Norristown, both of Pa.
[73] Assignees: Bulk Liner Corporation, Allentown: by said Clark; Florig Equipment Company, Inc., Conshohocken, both of, Pa.; by said Florig
[22] Filed: Mar. 21, 1972
[21] Appl. No.: 236,604

Related U.S. Application Data
[62] Division of Ser. No. 1,078, Jan. 7, 1970, Pat. No. 3,731,828.

[52] U.S. Cl.................... 214/49, 214/53, 214/308
[51] Int. Cl............................................ B65g 67/40
[58] Field of Search ......... 214/45, 47, 49, 52 R, 53, 214/54, 55, 305, 64.2, 308, 314; 296/39 R; 220/63 R; 222/83, 83.5, 86, 161

[56] References Cited
UNITED STATES PATENTS
2,786,587 3/1957 Straight............................ 214/54 X
3,257,040 6/1966 Dumbaugh et al. ................ 222/161
3,552,346 1/1971 Garden........................... 214/83.3 X

*Primary Examiner*—Robert G. Sheridan
*Attorney, Agent, or Firm*—Mason, Fenwick & Lawrence

[57] ABSTRACT

A bulk material handling system generally including a carrier for transporting bulk material, the carrier having an opening closed by a rupturable panel, means for supporting the carrier, means for tilting the support means to cause the bulk material within the carrier to gravity flow toward the closed opening when the carrier is positioned on the support means, a rigid upright frame structure mounted on the support means, a rigid panel mounted on the upright frame structure, movable into engagement with the rupturable panel when the carrier is positioned on the support means, for supporting the weight of the bulk material within the carrier when the support means is tilted to cause the bulk material to flow toward the closed opening, and the rigid panel having discharge means through which bulk material within the carrier may be conveyed and discharged when the rigid panel engages the rupturable panel on the carrier, a portion of the rupturable panel is ruptured to intercommunicate the interior of the carrier and the interior of the discharge means and the support means is tilted to cause the bulk material within the carrier to gravity flow towards the closed opening and into the discharge means.

3 Claims, 8 Drawing Figures

BULK MATERIAL HANDLING SYSTEM

This is a division of application Ser. No. 1,078 filed Jan. 7, 1970, now U.S. Pat. No. 3,731,828.

This invention relates to a material handling system, and more particularly to a system for transporting bulk materials between terminal points and unloading such materials at their destinations. This invention further contemplates a novel bulk material unloading apparatus, and a novel bulk material carrier provided with means for rapidly and efficiently unloading such material at a destination.

In the chemical, mining, food processing and other industries, it commonly is necessary to transport large quantities of bulk materials between terminal points. Because of their fine particle size, such materials have poor flow properties which makes it difficult to load and unload such materials in bulk material carriers. In the past, numerous methods have been employed for loading and unloading bulk materials in carriers. Such methods have ranged from the use of simple gravity load and unload procedures to the use of highly developed air conveying systems. None of such conventional methods, however, have been found to be entirely satisfactory from the viewpoint of performance in service and economy of operation.

Accordingly, it is the principal object of the present invention to provide a novel material handling system.

Another object of the present invention is to provide a novel system for transporting a material between terminal points and unloading such material at a destination.

A further object of the present invention is to provide a novel bulk material handling system.

A still further object of the present invention is to provide a novel system for transporting a bulk material having relatively poor flow properties between terminal points, and unloading such material at a destination.

Another object of the present invention is to provide a novel system for transporting and unloading bulk materials having a small particle size, which is comparatively simple in construction, relatively inexpensive to manufacture, and easy to operate and service.

A further object of the present invention is to provide a novel unloading apparatus.

A still further object of the present invention is to provide a novel apparatus for unloading bulk materials having relatively poor flow properties.

Another object of the present invention is to provide a novel apparatus for unloading the bulk material contents of a carrier unit.

A further object of the present invention is to provide a novel apparatus for unloading a bulk material having relatively poor flow properties, utilizing gravity flow.

A still further object of the present invention is to provide a novel apparatus for unloading bulk materials which is relatively simple in construction, comparatively inexpensive to manufacture and service and simple to operate.

Another object of the present invention is to provide a novel carrier for transporting and unloading bulk materials having relatively poor flow characteristics.

Other objects and advantages of the present invention will become more apparent to those persons having ordinary skill in the art to which the present invention relates, from the following description taken in conjunction with the accompanying drawings, wherein:

Briefly described, the present invention relates to a bulk material handling system generally including a carrier for transporting bulk material, having an opening closed by a rupturable panel, means for supporting the carrier, means for tilting the support means to cause the bulk material within the carrier to gravity flow towards the closed opening when the carrier is positioned on the support means, and rigid upright means mounted on the support means and engageable with the carrier when the carrier is mounted on the support means and the support means is tilted to cause the bulk material to gravity flow toward the closed opening of the carrier. The upright means is provided with discharge means through which bulk material within the carrier may be conveyed and discharged when the upright means engages the carrier, a portion of the rupturable panel is ruptured to intercommunicate the interior of the carrier and the interior of the discharge means and the support means is tilted to cause the bulk material within the container to gravity flow toward the closed opening in the carrier.

In the preferred embodiment of the invention the rigid upright means is provided with a rigid panel which is movable into engagement with the rupturable panel to support the weight of the bulk material when the carrier is tilted. In addition, the rigid panel is provided with means for moving the rigid panel into and out of engagement with the rupturable panel, and the rigid panel is mounted on the rigid upright means for floating movement in a plane disposed substantially normal to the line of travel of the rigid panel when moved into and out of engagement with the rupturable panel.

Figure 1:
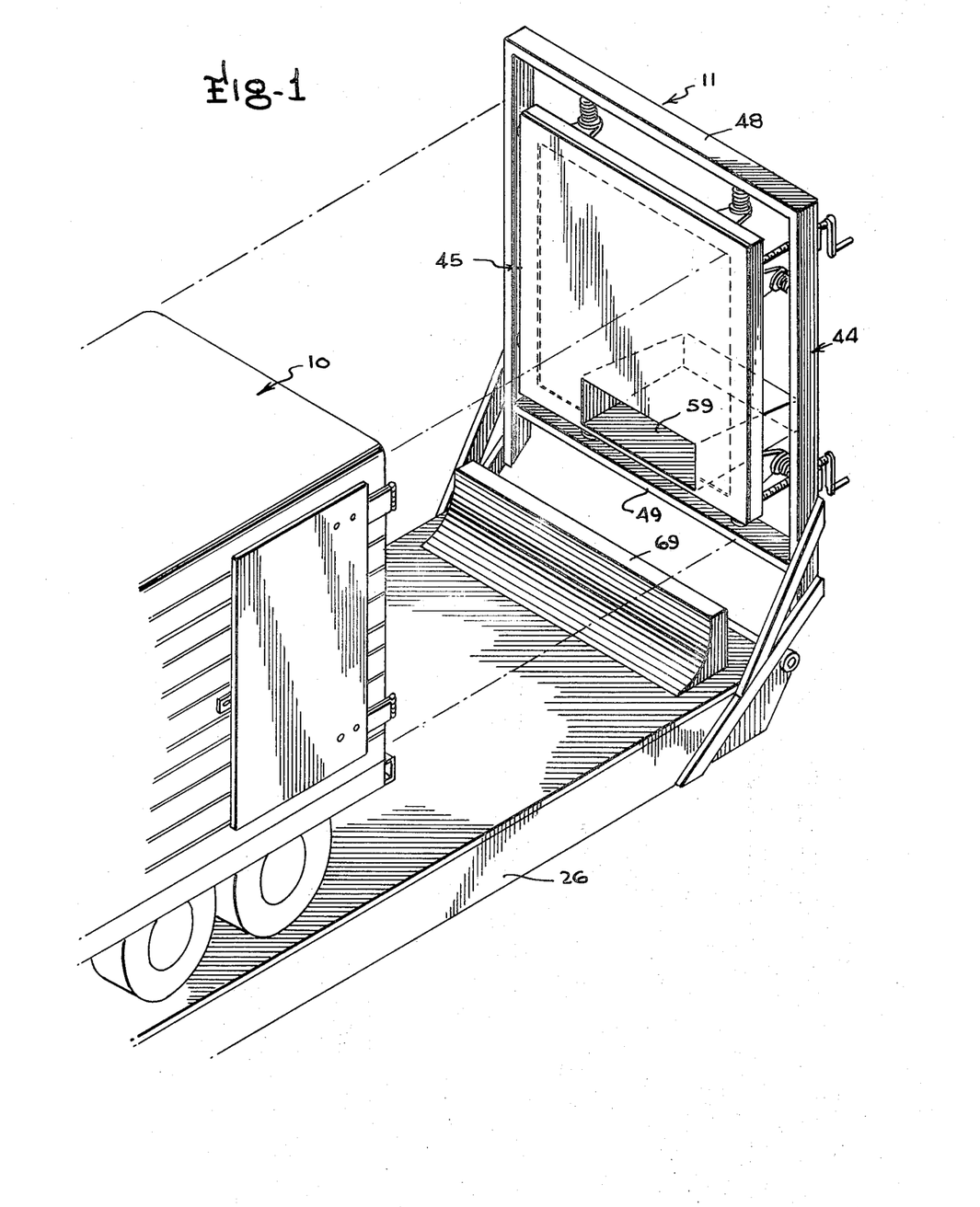
FIG. 1 is a perspective view of an embodiment of the invention, having a portion thereof broken away.
Figure 2:
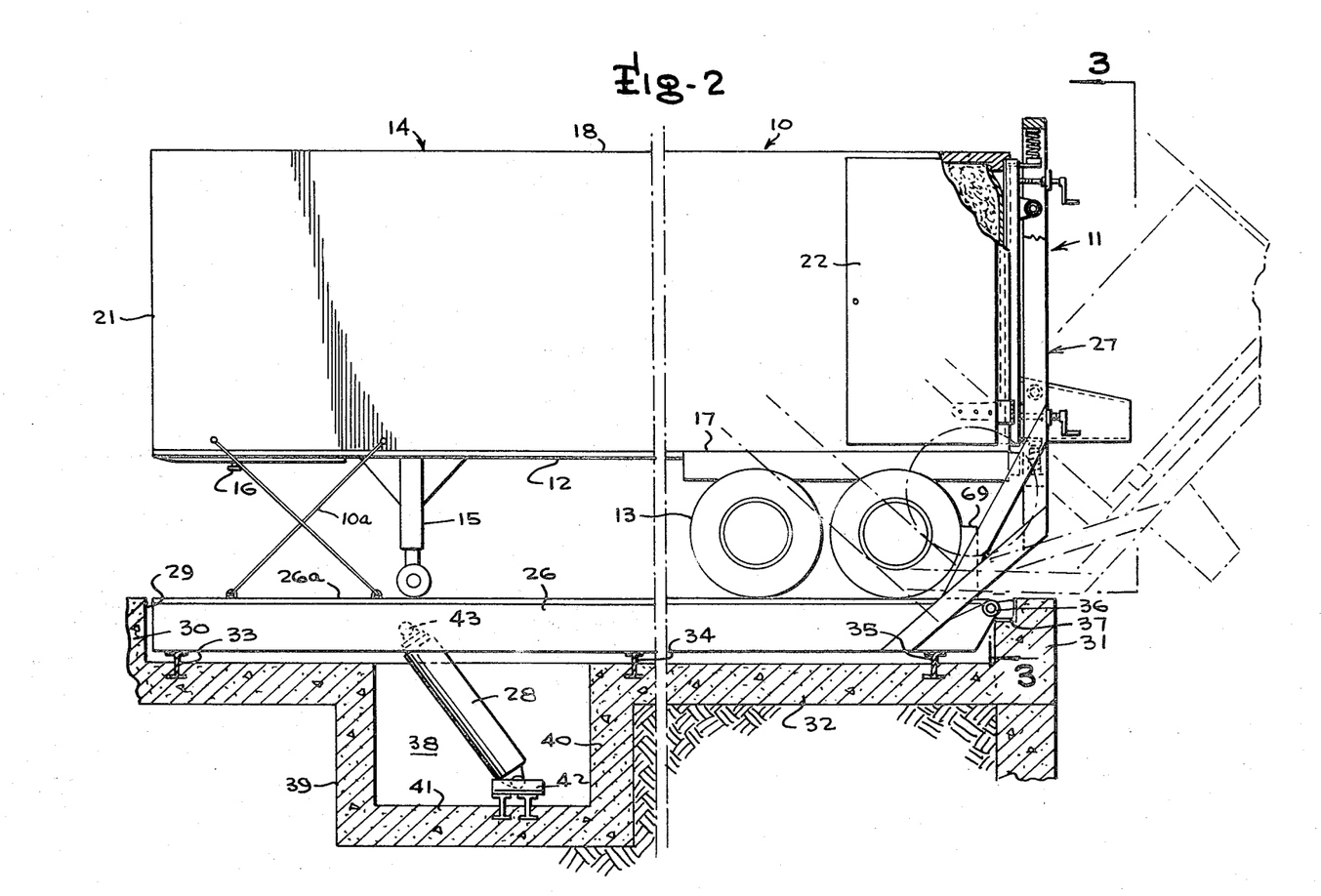
FIG. 2 is a vertical cross-sectional view of the embodiment illustrated in FIG. 1, having portions thereof broken away.

Referring to FIGS. 1 through 4, there is illustrated a system for transporting and unloading a bulk material which generally includes a bulk material carrier 10 and an unloading apparatus 11. The carrier unit is adapted to be positioned on the unloading apparatus, as illustrated in FIG. 2, and includes a chassis 12 mounted on a wheel unit 13, and a container 14 rigidly mounted on the chassis. The chassis further is provided with a pair of conventional support legs 15 for supporting the forward end of the carrier when it is not connected to a tractor unit, and a connecting unit 16 for detachably securing the carrier unit to a tractor unit. The container 14 is substantially rectangular and includes a bottom wall 17 seated on the chassis, a top wall 18, a pair of spaced side walls 19 and 20, a front end wall 21, and a pair of doors 22 and 23 (not shown) which are hinged to the side walls 19 and 20 and may be swung inwardly and together to close the rear end opening of the container or outwardly and positioned against the outer sides of the side walls of the container.

Figure 4:
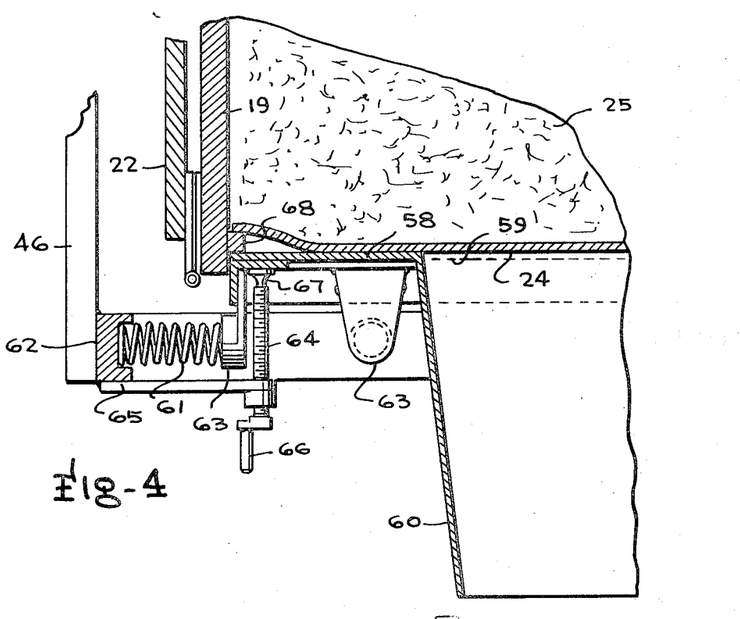
FIG. 4 is an enlarged cross-sectional view taken along line 4—4 in FIG. 3.

As best illustrated in FIGS. 2 and 4, the container is provided with a rupturable panel 24 which closes the entire rear end opening of the container. The rupturable panel may consist of any suitable material including a heavy paper, cardboard or plastic material which has sufficient strength characteristics to resist the lateral component of force of the weight of bulk material 25 disposed within the container, when the container is disposed in substantially the horizontal position, and which may be ruptured to provide an opening through which the bulk material may flow, as will later be described. The rupturable wall further is adapted to be supported during transit by the doors 22 and 23 which will engage the rupturable panel when closed. It further is to be understood that the rupturable panel 24 may consist of a section of a flexible liner disposed within the container for holding the bulk material within the container.

Although the carrier 10 illustrated in the particular system shown in FIGS. 1 through 4 consists of a trailer adapted to be connected to a tractor unit for transporting the bulk material contents thereof between terminal points, it is to be understood that the carrier unit may consist of a truck with a container unit mounted thereon, a detachable container unit as used in containerization systems, a railway car, a cargo barge and the like, In essence, the carrier unit may consist of any means for carrying a bulk material between terminal points.

The unloading apparatus consists of a platform 26 on which the carrier 10 is positioned and detachably secured, an upright frame structure 27 rigidly secured to the rear end of the platform, and a hydraulic cylinder assembly 28 for tilting the platform 26 and the upright frame structure 27 rearwardly as an integral unit. The platform 26 in the horizontal position is received within a pit 29 defined by a front retaining wall 30, a rear retaining wall 31, parallel side retaining walls, and a bottom wall 32. The walls of the pit preferably are constructed of concrete and are provided with a plurality of transversely disposed I-beams 33, 34, and 35 which are partially embedded in the bottom wall 32, and support the platform 26 on the upper ends thereof so that the upper supporting surface 26a will be substantially at ground level. As illustrated in FIG. 2, the rear end of platform 26 is pivotally connected as at 36 to suitable fixtures 37 embedded in the rear retaining wall 31 to permit the platform 26 to be tilted rearwardly about the axis of the pivotal connection 36.

The pit further is provided with a recessed chamber 38 defined by a front wall 39, a rear wall 40, a pair of side walls and a bottom wall 41 which houses the hydraulic cylinder assembly 28. The lower end of the assembly is pivotally connected to a fixture 42 having the lower end thereof embedded in the bottom wall 41 of the chamber, and the upper end thereof is pivotally connected to a forward point of the platform 26 as at 43, so that when fluid under pressure is supplied either to the front or rear end of the cylinder of the assembly, the platform will be tilted about the axis of the pivotal connection at 36. The hydraulic cylinder assembly 28 operates in a conventional manner and may be remotely controlled by an operator, as is conventional practice.

Figure 3:
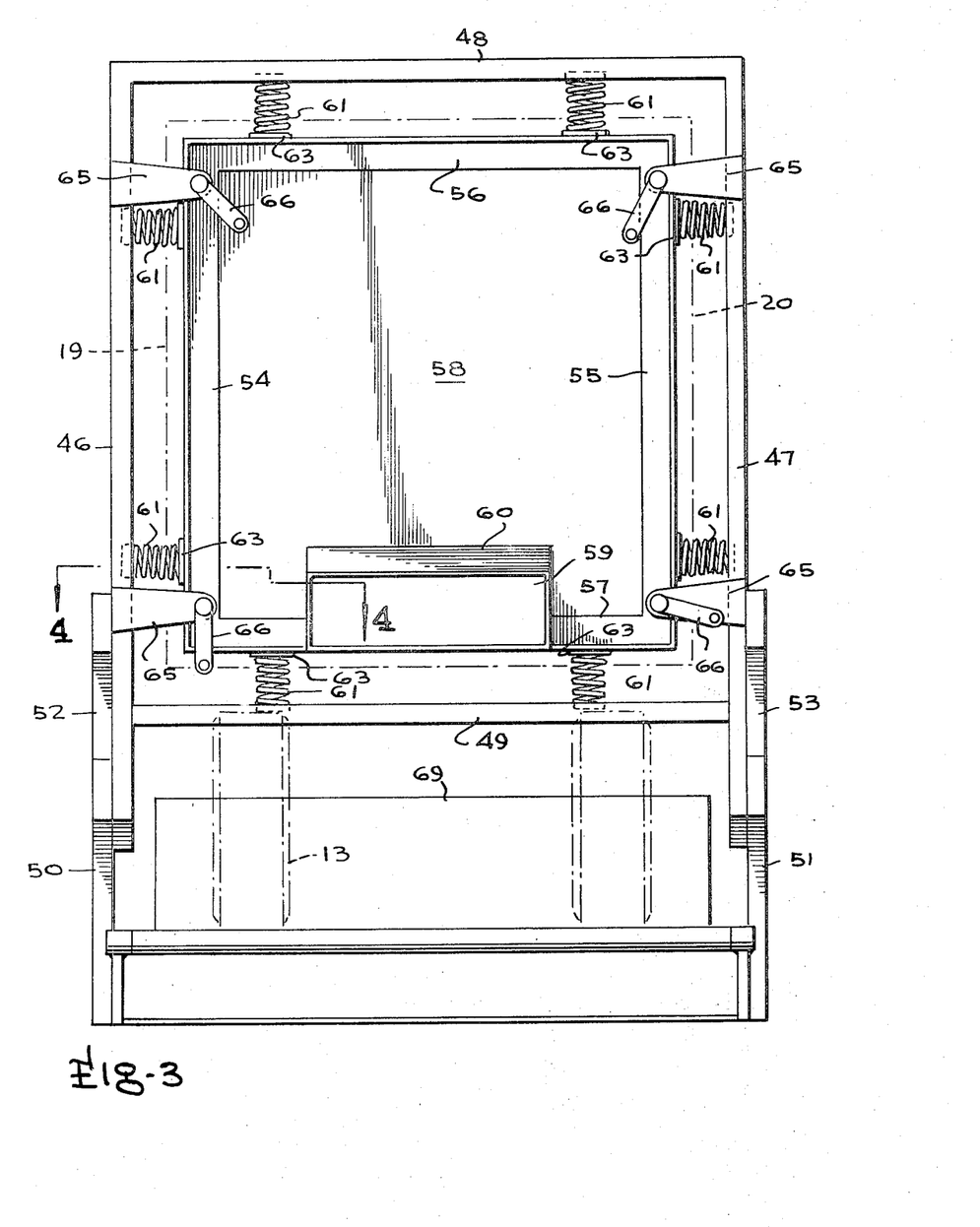
FIG. 3 is an enlarged cross-sectional view taken along line 3—3 in FIG. 2.

As best illustrated in FIGS. 1 and 3, the rigid frame structure 27 consists of a stationary unit 44 and a movable unit 45 which is adapted to move relative to the unit 44. The stationary unit includes a pair of vertical, spaced side frame sections 46 and 47 interconnected at their upper ends by a transversely disposed, frame section 48 and interconnected adjacent the lower ends thereof by a transversely disposed lower frame section 49. The stationary unit is disposed substantially normal to the support surface 26a of the platform and is rigidly secured to the rear end of the platform by means of a pair of support arms 50 and 51 interconnecting the lower ends of the side frame section 46 and 47 with the side walls of the platform, and a pair of brace members 52 and 53 interconnecting the support arm members 50 and 51 with the side frame sections 46 and 47 of the unit 44. It is contemplated that the platform 26, the stationary unit 44, the support arms 50 and 51, and the brace members 52 and 53 be constructed of steel and the support arms and brace members be welded to the platform and the stationary unit.

The movable unit 45 has a rectangular configuration and is smaller than the opening defined by the sections 46 through 49. The movable unit also is provided with a pair of side frame sections 54 and 55 which are spaced parallel to the side frame sections 46 and 47, an upper transversely disposed frame section 56 interconnecting the upper ends of the side frame sections 54 and 55, and a lower transversely disposed frame section 57 interconnecting the lower ends of the side frame sections 54 and 55. Mounted on the front side of the frame sections 54 through 57 is rigid panel 58 having an opening 59 communicating with the interior of a rearwardly projecting discharge spout 60 secured to the rear face of the panel 58. As illustrated in FIGS. 2 and 4, the spout 60 projects through the opening in the stationary unit 44 and has a sufficient length so that the free end thereof will clear the rear side of the stationary unit when the movable unit 45 is moved to its forwardmost position.

It is contemplated that the frame sections of the movable unit be constructed of angle iron and the panel 58 and the spout 60 be constructed of steel plate. It further is contemplated that the movable unit be of a welded construction.

The movable unit 45 is supported on the stationary unit 44 for floating movement in a plane disposed substantially normal to the support surface 26a of the platform by means of a plurality of springs 61 having the outer ends thereof seated in mounting blocks 62 rigidly secured to the upper, lower and side frame sections of the stationary unit, and the inner ends thereof seated in rearwardly projecting brackets 63 rigidly secured, preferably by welding, to the upper, lower and side frame sections of the movable unit 44. The movable unit is moved along a line of travel disposed substantially normal to the parallel planes of the stationary and movable units by means of a set of motion translating or feed screws 64 which are threaded in openings of brackets 65 secured to the side frame sections 46 and 47 of the stationary unit. As best illustrated in FIGS. 2, 3, and 4, each of the screws 64 is provided with an operating handle on the outer free end thereof and a bearing element 67 on the forward end thereof which engages or may be secured to the side sections 54 or 55 of the movable unit. It thus will be seen that by turning the screws 64 by means of the operating handles 66, the movable panel 58 can be moved into and out of engagement with the rupturable wall 24 of the carrier when the carrier is positioned on the platform 26 and the rupturable panel 24 is disposed adjacent the rigid frame structure.

As shown in the drawings, the size and shape of the rigid panel 58 is such that when the rigid panel 58 is moved toward the carrier supported in position on the platform 26, the rigid panel will be received within the rear end opening of the carrier to engage the rupturable panel 24 and thus provide a broad bearing surface to support the weight of the bulk material 25 when the unloading apparatus is tilted. It further is to be understood that the alternate means may be provided for moving the rigid panel 58 into and out of engagement with the rupturable panel 24. Specifically, it is contemplated that the actuating means may consist of fluid or cam actuated means, the prime requisite of any such means being to be able to move the rigid panel 58 into and out of engagement with the rupturable panel 24 and to retain the rigid panel in position during the tilting operation of the unloading apparatus, so that the force of the weight of the bulk material contents of the carrier bearing on the rigid panel 58, will be transmitted through the mover means to the stationary unit 44.

In the use of the embodiment of the invention illustrated in FIGS. 1 through 4, in transporting bulk material from one terminal point to a second terminal point at which the unloading apparatus 11 would be located, the rupturable panel 24 is first mounted across the rear end opening of the carrier, perhaps by tacking the periphery of the rupturable panel to a peripheral wooden frame 68 provided around the opening of the carrier, and the doors 22 and 23 are closed, whereby they would engage the outer surface of the rupturable panel and provide a rigid bearing surface for the rupturable panel to prevent the collapse of the rupturable panel when subjected to lateral components of force caused by the movement of the bulk material or the weight of the bulk material while in transit. When the rupturable panel is in position and the doors 22 and 23 are closed and locked, the bulk material may be loaded into the container of the carrier by any suitable means. It is contemplated that the container would be provided with access openings, preferably along the top wall, so that the bulk material can be gravity fed into the container. It further is contemplated that the bulk material would be loaded into the container either with a conventional loading chute or hopper, or with the use of an air conveying system.

After the container of the carrier is fully loaded with the bulk material, the carrier may be attached to a tractor unit and then transported from the first terminal point to the second terminal point where the unloading apparatus 11 would be located. As previously mentioned, the rigid doors 23 and 24 of the carrier would prevent the collapse of the rupturable panel 24 while the carrier is in transit.

To unload the carrier at its destination, the rear doors 23 and 24 are swung outwardly and positioned against the outer side of the side walls 19 and 20 of the container. The carrier 10 is then backed onto the platform 26 until the rear wheels of the unit 13 engage a wheel stop 69 rigidly secured on the rear upper end of the platform 26. When the carrier is thus positioned on the platform 26, the rupturable panel 24 will be positioned adjacent and in alignment with the rigid panel 58. The tractor unit is then detached from the carrier and driven clear of the unloading apparatus, and the carrier unit is detachably secured to the platform 26 so that the carrier may be tilted with the platform 26 as an integral unit. Any suitable attaching means may be utilized, including any type of cable arrangement.

After the carrier has been rigidly secured to the platform 26, the handles 66 of the screws 64 are turned to move the rigid panel 58 forwardly and into firm engagement with the rupturable panel 24. An operator may then reach through the discharge spout 60 and remove a portion of the rupturable panel 24 to provide an opening in the rupturable panel, thereby communicating the interior of the container 14 with the interior of the discharge spout to permit the bulk material to flow into the discharge spout. The opening in the rupturable material can be made manually with the use of a hand tool, such as a knife and the like.

As soon as the access opening in the rupturable panel has been made, the operating personnel would then stand clear of the unloading apparatus, and actuate the proper controls to operate the hydraulic cylinder assembly 28. The supply of fluid under pressure to the rear end of the hydraulic cylinder assembly will cause the unloading apparatus 11 with the carrier 10 firmly secured thereon, to tilt rearwardly about the axis of the connection at 36 to a position as illustrated by the broken lines in FIG. 2, thereby causing the bulk material within the carrier to gravity flow through the access opening in the rupturable panel and be discharged through the spout 60. The bulk material may be discharged into another container, or into a conveying system, depending upon the particular facilities available at the terminal point and the specific use of the bulk material. It is contemplated that the material could be discharged onto a belt conveying system or into a hopper to be fed into an air conveying system.

The rupturable panel 24 may consist of a single piece of rectangular material or may consist of a section of a disposable flexible liner disposed within the container of the carrier. Whatever type of structure may be employed, it is contemplated that no significant lateral forces will be developed during the interval when the container doors 22 and 23 are opened, the carrier is backed onto the platform 26, and the movable rigid panel 58 is positioned into engagement with the rupturable panel, to cause the rupturable panel to collapse or rupture, thus causing the loss of bulk material within the container.

Figure 5:
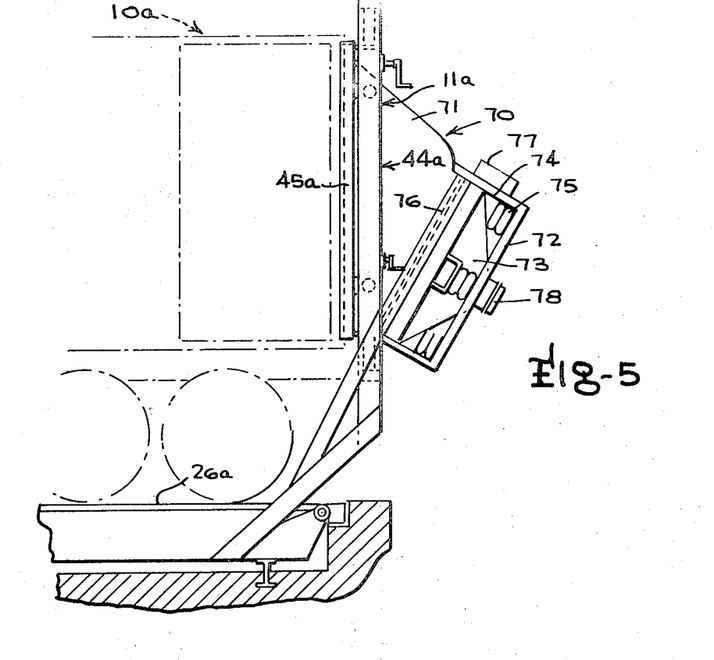
FIG. 5 is a side elevational view of another embodiment of the invention, having a portion thereof broken away.

FIG. 5 illustrates a modification of the embodiment illustrated in FIGS. 1 through 4. The modification includes a carrier unit 10a which is substantially similar to the carrier unit 10, as previously described, and an unloading apparatus 11a which is similar to the unloading apparatus 11 of the embodiment shown in FIGS. 1 through 4, with the exception of the discharge means, The unloading means of the modification specifically includes a platform 26a for supporting the carrier unit, an upright frame structure 44a, a movable unit 45a, which is displaceable relative to the frame structure 44a to be moved into and out of engagement with the rupturable panel provided in the rear end of the carrier 10a, and a discharge hopper 70 which is mounted on the movable unit 45a. The discharge hopper consists of a stationary section 71 rigidly mounted on the movable unit 45a, a support frame 72 depending from the stationary hopper section 71 and a floating funnel-shaped hopper section 73 which is provided with laterally projecting brackets 74 seated on resilient units 75 mounted on the depending support frame. The stationary hopper section 71 and the movable hopper section 73 are connected together by a flexible band 76 which permits the section 73 to move relative to the section 71. A vibrating unit 77 is mounted on the movable section 73 which may be operated to vibrate the hopper section 73 to induce the flow of bulk material through the discharge hopper 70 when the carrier is tilted and the bulk material contents thereof are caused to gravity flow into the discharge hopper. The movable section 73 is provided with a discharge spout 78 through which bulk material is discharged, and which may be connected to an air conveying system at the unloading site.

The modification illustrated in FIG. 5 is operated in a manner similar to the manner described in connection with the embodiment shown in FIGS. 1 through 4, with the exception that the vibrator 77 is operated to induce the flow of bulk material through the discharge hopper.

An alternate of the modification shown in FIG. 5 would consist of the discharge hopper 70 being rigidly secured to a rear end wall of the carrier 10a and being adapted to extend through an opening in the rigid frame structure 44a which would engage the rear end of the carrier 10a. or a portion of the stationary hopper section 71 to bear the load of the bulk material contents of the carrier when the carrier unit is tilted during the unloading operation.

Figure 6:
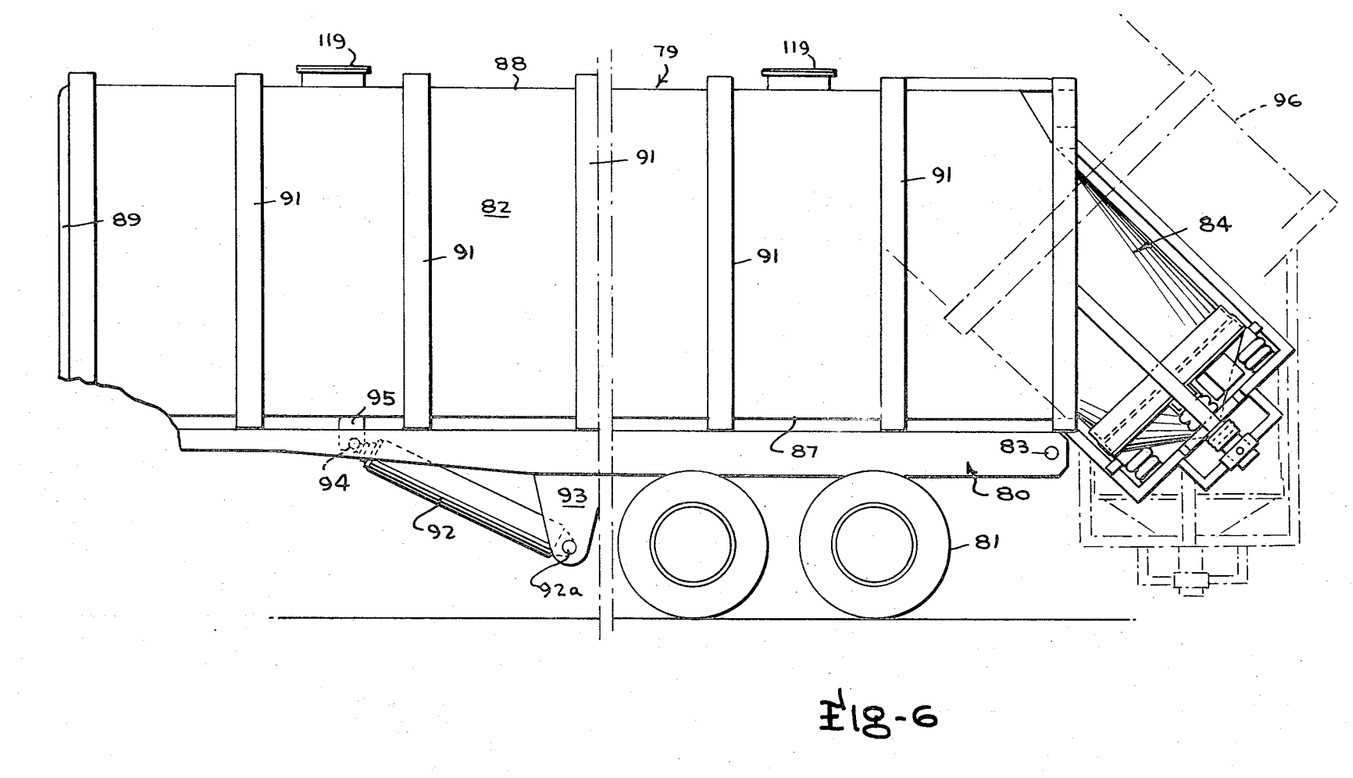
FIG. 6 is a side elevational view of a third embodiment of the invention, having portions thereof broken away.
Figure 7:
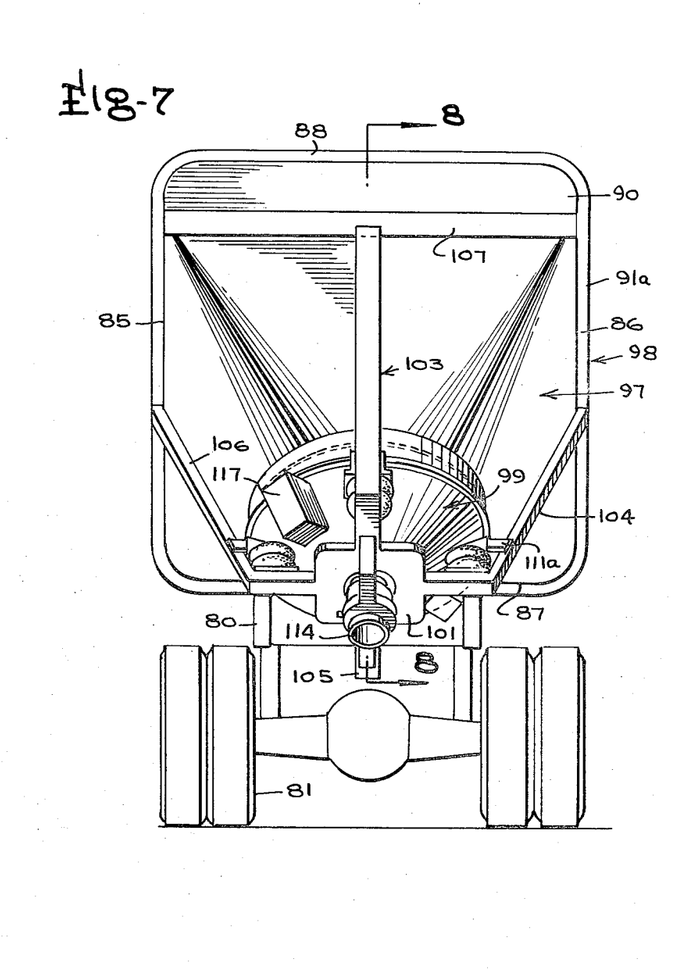
FIG. 7 is a rear end view of the embodiment illustrated in FIG. 6.
Figure 8:
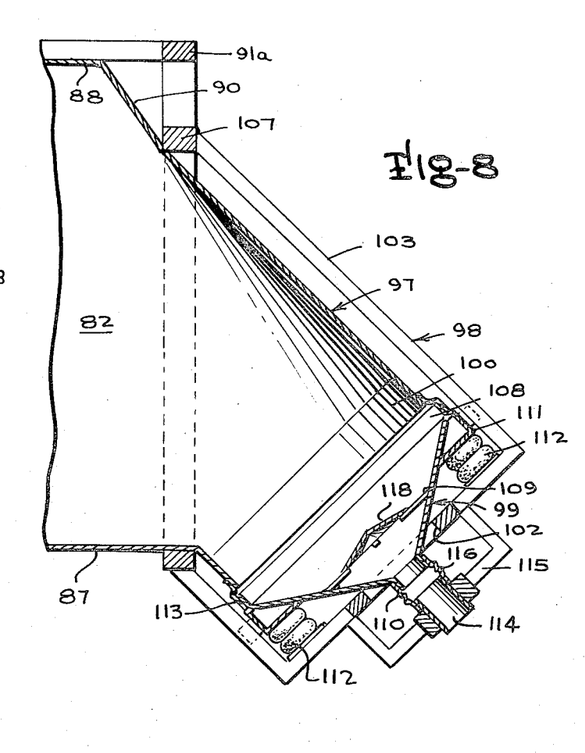
FIG. 8 is an enlarged cross-sectional view taken along line 8—8 in FIG. 7.

The embodiment illustrated in FIGS. 6 through 8 consists of a carrier unit 79 including a chassis 80 mounted on a wheel unit 81, a bulk material container 82 pivotally mounted at the rear end thereof to the rear end of the chassis 80 as at 83, and a discharge hopper 84 mounted on the rear end of the container. The container 82 is substantially rectangular, having a pair of spaced side walls 85 and 86, a bottom wall 87, a top wall 88, a front wall 89, and a rear end wall 90. A plurality of longitudinally spaced peripherally disposed reinforcing members 91 are provided to enhance the rigidity of the container.

The container is tilted rearwardly on the chassis by means of a hydraulic cylinder assembly 2 having the cylinder member thereof pivotally connected as at 92 to a bracket 93 depending from the chassis, and the ram member thereof pivotally connected at as at 94, to a bracket 95 depending from a forward point of the bottom wall of the container. It will be seen that by operating the hydraulic cylinder assembly 92, the container 82 may be tilted rearwardly to cause the bulk material contents of the container to gravity flow into the discharge hopper.

As best illustrated in FIG. 6, the longitudinal centerline of the discharge hopper 84 is disposed at an angle to the longitudinal centerline of the container 82, so that when the container is tilted rearwardly to a position as illustrated by the broken lines 96, the centerline of the discharge hopper will be disposed substantially vertically.

The discharge hopper 84 consists of a stationary section 97 communicating at the forward end thereof with the interior of the container 82, a depending frame structure 98 secured to the rear end of the container, and a movable hopper section 99 which is supported on the depending frame structure 98. The stationary hopper section 97 has a converging configuration and terminates in a cylindrical end portion 100. As best illustrated in FIG. 8, the longitudinal centerline of the stationary hopper section 97 is disposed at a downwardly inclined angle relative to the longitudinal centerline of the container 82.

The support frame structure 98 includes a base section 101 provided with a center opening 102, and a set of arm sections 103, 104, 105 and 106. The arm sections are provided with outwardly projecting portions lying substantially in the same plane as the base section 101 and extension portions which are disposed at angles to the inner portions of the arm sections and are secured at their ends, preferably by welding, to the rearmost reinforcing member 91a of the container. The arm section 103 includes an inner arm portion and an extension arm portion disposed at an angle to the inner arm portion thereof, having the end thereof rigidly secured, again preferably by welding, to a cross beam member 107 interconnecting the spaced side section of the rearmost reinforcing member 91a of the container.

The movable hopper section 99 includes a cylindrical portion 108 having a diameter slightly greater than the cylindrical portion 100 of the stationary hopper section, a conical portion 109 and a cylindrical spout portion 110. Circumferentially disposed on the conical portion 109 are mounting flanges 111 which are seated on cushioning units 112 mounted on the inner portions of the arm sections 103 through 106. The adjacent ends of the two hopper sections are connected together by means of a flexible band 113 which permits the movable hopper section 99 to move relative to the stationary hopper section 97. The discharge hopper further is provided with a cylindrical nozzle 114 disposed coaxially with the cylindrical nozzle portion 110 and which is mounted on a bracket 115 rigidly secured to the support frame structure 98. The cylindrical nozzle 114 is connected to the spout portion 110 by means of a flexible band 116 which permits the movable hopper section 99 to move freely between the stationary hopper section 97 and the cylindrical nozzle 114.

A vibrating unit 117 is mounted on the movable hopper section and is operable to vibrate the movable hopper section and thus induce the flow of bulk material through the discharge hopper. As best shown in FIG. 7, the mounting brackets 111 are provided with outwardly projecting fingers 111a which engage the extension portions of the arm sections 103 through 106 to guide the movable hopper section when it is vibrating, to induce the flow of bulk material through the discharge hopper. In addition, as illustrated in FIG. 8, a conical baffle 118 is provided within the movable hopper section to divert the flow of material radially relative to the centerline of the hopper section, thus preventing the outflow of bulk material along the centerline of the discharge hopper, a condition commonly referred to as "coring" or "rat-holing."

In the operation of the embodiment as illustrated in FIGS. 6 through 8, to unload the bulk material contents of the carrier unit, the carrier unit is positioned at the desired location adjacent a container or pit into which the material is to be unloaded, or adjacent an air conveying system which can be connected to the outlet of the discharge hopper. When the carrier unit is thus positioned, the vibrating unit 117 is actuated to induce the flow of bulk material through the discharge hopper and the hydraulic cylinder assembly 92 is actuated to tilt the container 82 rearwardly about the axis of the pivot point 83 to cause the bulk material contents of the container to gravity flow rearwardly into the discharge hopper. It thus will be seen that the carrier unit can easily be positioned at an unloading site and easily operated to quickly unload the bulk material contents of the container. The combined effect of the gravity flow of the bulk material caused by the tilting of the container and the agitation of the bulk material flowing through the discharge hopper caused by the vibrating unit, operates to unload the bulk material contents of the container both quickly and efficiently.

It is contemplated that bulk material can be loaded into the container 82 by means of access units 119 provided along the top wall 88 of the container. Such units would permit the bulk material to be loaded in the container with the use of conventional chutes, loading hoppers or a discharge component of an air conveying system. It further is contemplated that the container be provided with a flexible liner for holding the bulk material, having a spout portion extending into the discharge hopper 84.

From the foregoing detailed description, it will be evident that there are a number of changes, adaptations and modifications of the present invention which will come within the province of those skilled in the art. However, it is intended that all such variations not departing from the spirit of the invention be considered as within the scope thereof as limited solely by the appended claims.

We claim:

1. An apparatus for unloading the bulk material contents of a carrier having an opening closed with a rupturable panel comprising means for supporting said carrier, means for tilting said support means to cause the bulk material within said carrier to gravity flow towards said closed opening, a rigid upright frame structure mounted on said support means, a rigid panel mounted on said upright frame structure movable into engagement with said rupturable panel when said carrier is positioned on said support means for supporting the weight of the bulk material within the container when said support means is tilted to cause said bulk material to gravity flow toward said closed opening, and said rigid panel having a discharge hopper including flow inducing means through which bulk material within said carrier may be conveyed and discharged when said upright frame structure engages said carrier, a portion of said rupturable panel is ruptured to intercommunicate the interior of said carrier and the interior of said discharge hopper and said support means is tilted to cause the bulk material within said carrier to gravity flow toward said closed opening thereof.

2. An apparatus for unloading the bulk material contents of a carrier having an opening closed with a rupturable panel according to claim 1, wherein said discharge hopper includes a floating end section and said inducing means comprises means for vibrating said floating end section.

3. An apparatus for unloading the bulk material contents of a carrier having an opening closed with a rupturable panel comprising a platform tiltable about a horizontal axis for supporting said carrier, means for detachably securing said carrier to said platform, fluid actuated means for tilting said platform to cause the bulk material within said carrier to gravity flow towards said closed opening, a rigid upright frame structure mounted on said platform, a rigid panel mounted on said upright frame structure movable into engagement with said rupturable panel when said carrier is positioned on said platform for supporting the weight of the bulk material within the container when said platform is tilted to cause said bulk material to gravity flow toward said closed opening, said rigid panel being mounted on said rigid frame structure for floating movement in a plane disposed substantially normal to the line of travel of said rigid panel in being moved into and out of engagement wih said rupturable panel, and said rigid panel having a discharge hopper including flow inducing means, through which bulk material within said carrier may be conveyed and discharged when said upright frame structure engages said carrier, a portion of said rupturable panel is ruptured to intercommunicate the interior of said carrier and the interior of said discharge hopper and said platform is tilted to cause the bulk material within said carrier to gravity flow toward said closed opening thereof.

* * * * *